Patented Mar. 23, 1954

2,673,220

UNITED STATES PATENT OFFICE 2,673,220 p,p'-METHYLENE BIS (BENZENE SULFONYL HYDRAZIDE)

Byron A. Hunter, Oxford, Conn., assignor to United States Rubber Company, New York, N. Y., a corporation of New Jersey No Drawing. Application May 14, 1952, Serial No. 287,798

1 Claim. (Cl. 260—556)

This invention resides in my discovery of p,p'-methylene bis (benzene sulfonyl hydrazide) as a new and useful composition of matter. This substance is a white, crystalline solid which melts with decomposition at 164–164.5° C. Nitrogen gas is a product of the decomposition. When it is incorporated in rubber and subjected to normal curing temperatures the compound acts as a very efficient blowing agent and is capable of producing a light colored non-odorous cellular product possessing a fine and uniform cell structure which is very desirable. Blown organic plastics of excellent quality can also be made by using this chemical as a blowing agent.

p,p'-Methylene bis (benzene sulfonyl hydrazide) may be prepared from diphenyl methane by first forming the disulfonyl chloride by treatment with chlorosulfonic acid and reacting the disulfonyl chloride so produced with hydrazine. The transformations are represented in the following equations:

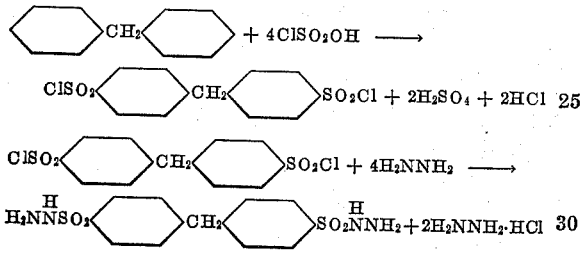

There now follows a description of the preparation of the disulfonyl chloride and of p,p'-methylene bis (benzene sulfonyl hydrazide.

*Preparation of p,p'-methylene bis (benzene sulfonyl chloride)*

Diphenyl methane was reacted with chlorosulfonic acid as follows: Eighty-four grams (0.5 mole) of diphenyl methane was heated to 70° C. A fairly rapid addition of 349.5 grams (3 moles) of chlorosulfonic acid was made keeping the temperature between 60° and 80° C. After the addition was complete the mixture was cooled to room temperature and stirred for three hours. The mix was quenched in cold water and the resulting precipitate was filtered, washed with water and dried. The crude product weighed 118.5 grams (64.3% yield). This material was recrystallized from chloroform, from ethyl acetate, and again from chloroform, whereupon, the material melted at 120–122° C. A portion of the material was recrystallized twice more from chloroform, using "Dicalite" (diatomaceous earth) as a decolorizing agent. The product melted at 124° C., in agreement with the value reported by Lapworth (J. Chem. Soc. 73, 408 (1898)). The following analyses are in very good agreement with those calculated for p,p'-methylene bis (benzene sulfonyl chloride).

Percent chlorine calculated for $C_{13}H_{10}O_4S_2Cl_2$: 19.45%. Percent chlorine found: 19.96%, 20.06%.

Percent sulfur calculated for $C_{13}H_{10}O_4S_2Cl_2$: 17.53%. Percent sulfur found: 17.37%, 17.34%, 17.31%.

*Preparation of p,p'-methylene bis (benzene sulfonyl hydrazide)*

Thirteen and one-half grams (0.04 mole) of p,p'-methylene bis (benzene sulfonyl chloride) (M. P. 120–122° C.) was placed in a 500 cc. 3-neck flask equipped with stirrer, addition funnel, and thermometer. Eethyl alcohol (150 cc.) was added and the mixture was stirred as 5.5 g. (0.16 moles) of 95% hydrazine was gradually added. The mixture was kept near 20° C. by means of a cooling bath. Stirring was continued for two hours after the addition of the hydrazine was completed. The reaction mixture was then poured into 1000 cc. of cold water and the resulting precipitate was filtered and dried. The crude product weighed 12.9 grams (97.7% of theory) and melted with decomposition at 152–3° C. The material was purified by dissolving in dilute sodium hydroxide solution, filtering from a small amount of insolubles and reprecipitating by acidification with dilute acetic acid. This solution in caustic and reprecipitation with acid was repeated once more and finally the product was recrystallized from hot distilled water. The resulting white needles melted with decomposition at 164–164.5° C. The following analyses agree very well with those calculated for p,p'-methylene bis (benzene sulfonyl hydrazide).

Percent sulfur calculated for $C_{13}H_{16}O_4S_2N_4$: 17.98%. Percent sulfur found: 17.97%, 18.05%.

Percent carbon calculated for $C_{13}H_{16}O_4S_2N_4$: 43.81%. Percent carbon found: 43.54%, 43.39%.

Percent hydrogen calculated for $C_{13}H_{16}O_4S_2N_4$: 4.51%. Percent hydrogen found: 4.37%, 4.19%.

Having thus described my invention, what I claim and desire to protect by Letters Patent is:

As a new chemical compound, p,p'-methylene bis (benzene sulfonyl hydrazide).

BYRON A. HUNTER.

References Cited in the file of this patent

UNITED STATES PATENTS

| Number | Name | Date |
|---|---|---|
| 2,552,065 | Schoene | May 8, 1951 |

FOREIGN PATENTS

| Number | Country | Date |
|---|---|---|
| 901,006 | France | Oct. 23, 1944 |

OTHER REFERENCES

Hunter et al., "India Rubber World" vol. 123, issue 5, p. 577, Feb. 1951.